United States Patent [19]

Dempsey

[11] Patent Number: 4,548,371
[45] Date of Patent: Oct. 22, 1985

[54] ULTRALIGHT AIRCRAFT

[75] Inventor: John M. Dempsey, East Longmeadow, Mass.

[73] Assignee: Ultralight Flight, Inc., Mt. Airy, N.C.

[21] Appl. No.: 387,487

[22] Filed: Jun. 11, 1982

[51] Int. Cl.⁴ ............... B64C 3/26; B64C 25/58; B64D 27/00
[52] U.S. Cl. ........................... 244/13; 244/54; 244/104 R; 244/123; 248/557
[58] Field of Search ......... 244/13, 16, 104 R, DIG. 1, 244/54, 132, 123, 90 R, 100 R; 416/230, 87; 248/554–557, 634

[56] References Cited

U.S. PATENT DOCUMENTS

| | | | |
|---|---|---|---|
| 1,773,481 | 8/1930 | Fokker | 244/54 |
| 1,856,306 | 5/1932 | Woodson et al. | 244/DIG. 1.4 |
| 1,884,849 | 10/1932 | Pitcairn et al. | 244/104 R |
| 4,095,760 | 6/1978 | Sommer et al. | 244/123 |
| 4,262,863 | 4/1981 | Slusarczyr | 244/13 |

OTHER PUBLICATIONS

'Ultralight Aircraft', Markowski, Ultralight Publications, pp. 36–38, 133–134 and pp. 138–141.

*Primary Examiner*—Galen L. Barefoot
*Attorney, Agent, or Firm*—Shefte, Pinckney & Sawyer

[57] ABSTRACT

Improved ultralight aircraft constructed with a tubular keel extending over the length of the aircraft from forward of its wing to the tail thereof. The aircraft includes a cantilever engine mount which is carried on a pair of mounting plates extending longitudinally from the forward end of the tubular keel. The propeller shaft, driven by the engine through a speed reduction arrangement, is supported in a bearing disposed on the engine mount. The aircraft includes a cage assembly for the operator's seat and has upright tubular rails and a pair of longitudinally extending side rails mounted on a shock absorbing landing gear. The landing gear has a nose wheel and a pair of laterally spaced rear wheels. The rear wheels are carried on the outer ends of a pair of longitudinally spaced, transversely extending tubular members. The forward of the tubular members is journaled for rotation on the underside of said side rails, and the rear member is releasably urged against the upper surface of the side rails by elastic bands or cords, which enable the rear member to move vertically relative to said side rails in response to landing impact. The aircraft is further constructed with full length ailerons, which are pivotably supported on the trailing edges on said wing. Each aileron is formed of a tubular frame disposed within a tapered fabric sheath which is in tension because of its tapered configuration and its dimensional relationship to the frame. The frame includes outer peripheral tubular portions and a plurality of parallel, laterally spaced cross tubes, each affixed at its outer end to the peripheral portion of the frame.

8 Claims, 10 Drawing Figures

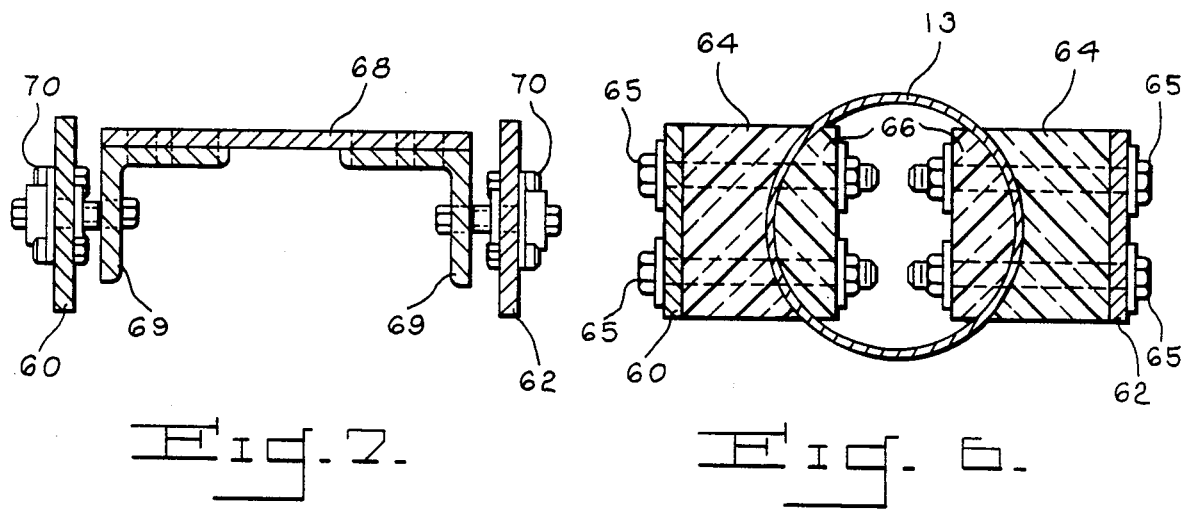
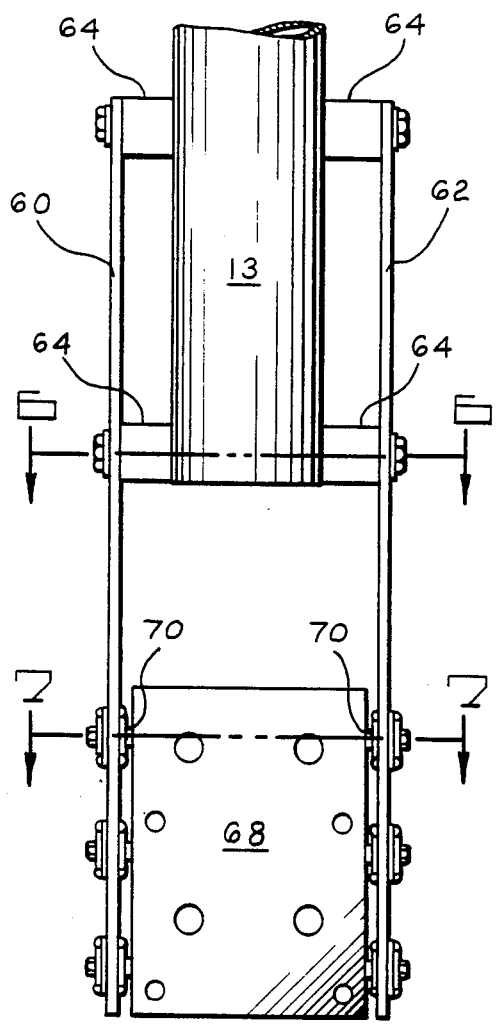

ULTRALIGHT AIRCRAFT

BACKGROUND OF THE INVENTION

In the last few years, a new industry has been created in the United States and in a number of other countries. This industry has been an outgrowth of the hang glider craze, which started several years ago with young Californians launching their gliders off the cliffs overlooking the Pacific Ocean. The genesis for hang glider came from the Rogallo wing developed by NASA as a re-entry vehicle for the space program. While hang gliding remains a very popular sport and recreation activity, its popularity is geographically limited to hilly or mountainous regions because it is necessary to have a cliff, mountain or ridge from which to launch the glider into rising air currents.

As a consequence, the natural progression from the hang glider was to add a small engine-driven propeller of sufficient power to launch the glider, now turned airplane, from a flat terrain. This marriage between the hang glider and the internal combustion engine has resulted in the ultralight industry. U.S. Pat. No. 4,262,863 discloses one such rudimentary type of engine powered hang glider which is foot launched. The glider disclosed in this patent has no landing gear, tail, rudder or ailerons to control its flight. As a result, hang gliders of this early vintage were controlled in the same manner as conventional hang gliders; that is, the pilot had to shift his weight while holding onto a control bar to control the attitude and flight direction of the glider.

Since the first rudimentary ultralight aircraft were flown, there have been a tremendous variety of new and different designs. In most cases, these ultralight aircraft are marketed in kit form and must be assembled by the customer. As a consequence, it is of the utmost importance that the ultralight aircraft be constructed for ease of assembly as well as safe and reliable performance. In recent months, consumers have been demanding ultralight aircraft having improved performance characteristics. Indeed, the drive is to closely duplicate the performance of a conventional airplane. Thus, while the industry has been attempting to improve the flight performance characteristics of its aircraft, manufacturing costs and simplicity of assembly remain fundamental criteria of the industry. To remain competitive in today's market, ultralight kits are presently priced to sell in approximately the $5,000. range, while still satisfying the consumer from the standpoint of flight characteristics and reliability.

Accordingly, it is the principal object of this invention to provide an improved ultralight of economical construction capable of safe and reliable performance approaching that of a conventional aircraft.

It is another object of this invention to provide an ultralight of the above type which is simple and economical to manufacture and is further characterized by ease of assembly by the consumer.

It is still a further object of this invention to provide an ultralight aircraft of the above type which includes a shock absorbing landing gear which is simple and economical in construction for maintaining the aircraft in a proper attitude during landing.

Another object of this invention is to provide a simple and strong engine and propeller mount whereby engine vibrations are isolated from the remainder of the aircraft frame.

Another object of this invention is to provide a simple, economical and effective aileron construction characterized by utmost ease of assembly without the necessity of shrinking of the fabric.

The above and other objects and advantages of this invention will be more readily apparent from the following description considered in conjunction with the accompanying drawings in which:

FIG. 5 is a partial top plan view of the aircraft engine mount;

FIG. 6 is a section on an enlarged scale taken along lines 6—6 of FIG. 5;

FIG. 7 is a section on an enlarged scale taken along line 7—7 of FIG. 5;

Figure 1:
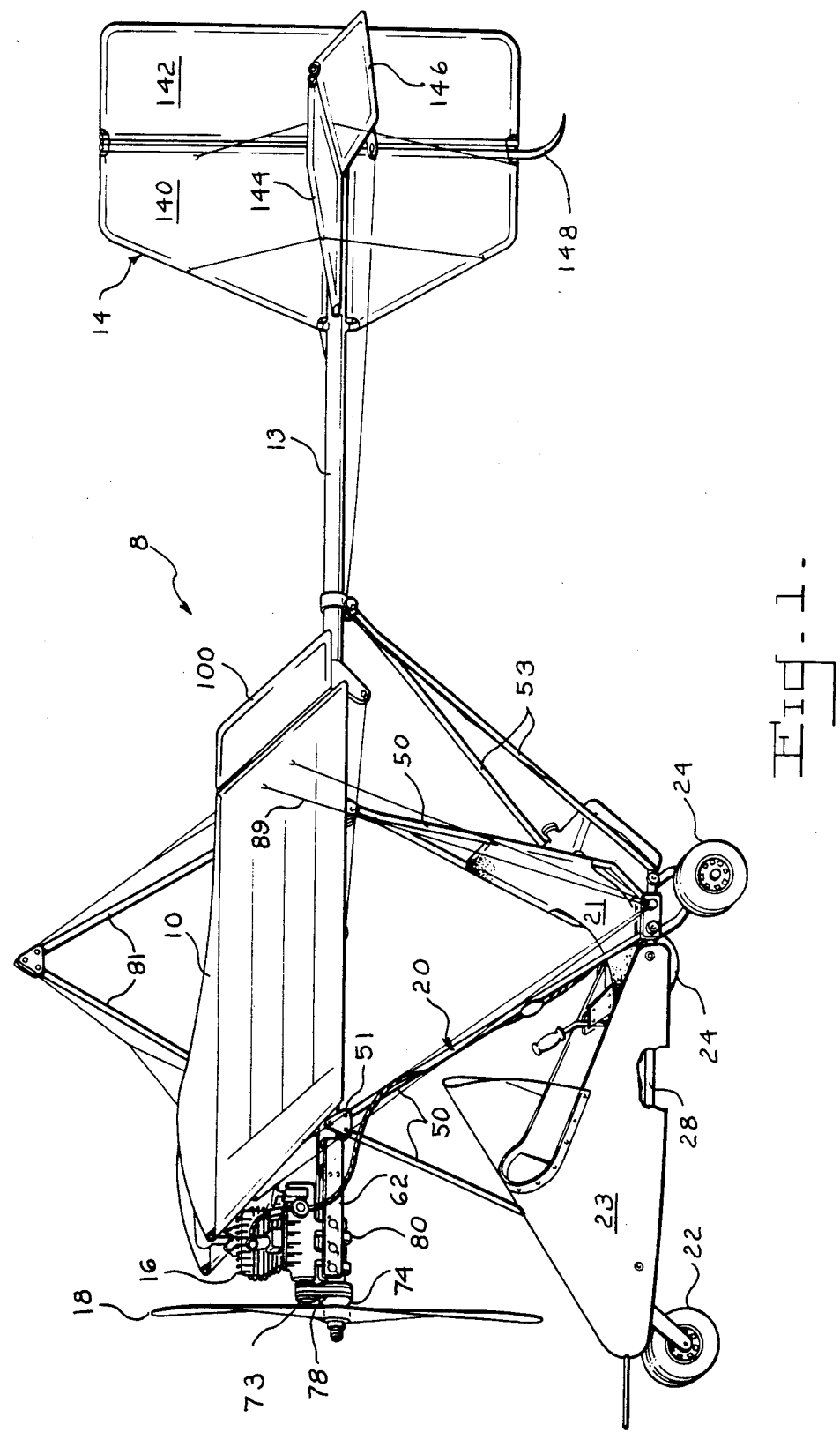
FIG. 1 is an overall perspective view of an ultralight aircraft of the type embodying this invention.

Referring in detail to the drawings in FIG. 1 is shown an ultralight aircraft 8 of the type embodying this invention. Generally, the aircraft comprises a wing 10 of a suitable sail type cloth fabric stretched over a supporting tubular aluminum frame structure. A tubular keel 13 extends the full length of the aircraft from forward of the wing 10 to the tail 14. An internal combustion engine 16 and propeller 18 are mounted forwardly of the wing and are supported by mounting plates extending from the keel tube. The aircraft includes a cage assembly, shown generally at 20 in which is disposed a seat 21 for the pilot. A streamline cowling 23 and windshield are disposed about the forward end of the cage assembly to protect the pilot from the prop wash. The cage assembly includes a tricycle landing gear comprising a fixed nose wheel 22 and a pair of shock absorbing rear wheels 24.

Figure 2:
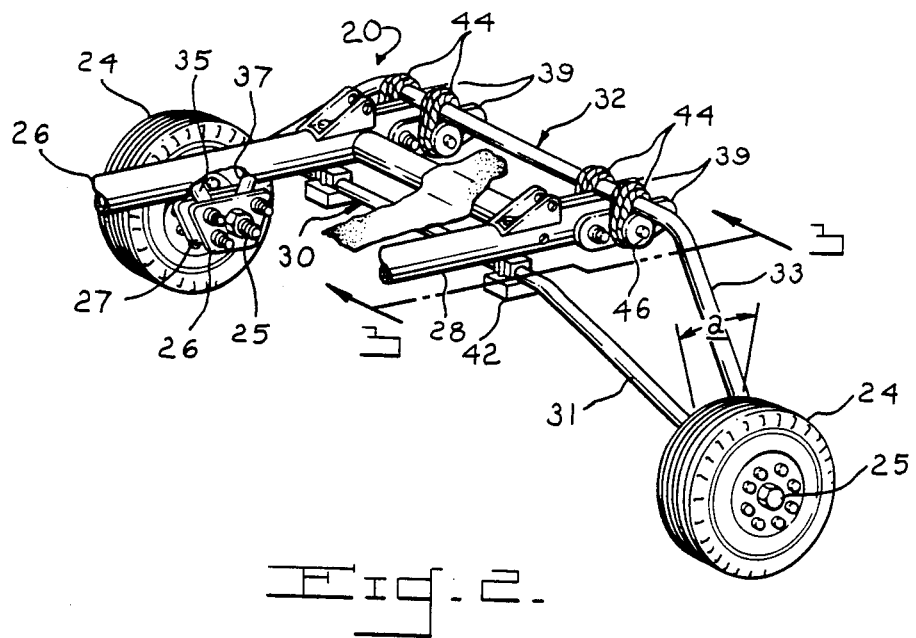
FIG. 2 is a partial perspective view showing a portion of the landing gear of the aircraft.

The landing gear nose wheel is mounted on an axle in fixed relation at the forward end of longitudinally extending side rails 26 and 28 of the cage assembly 20, best illustrated in FIG. 2. The side rails are triangularly oriented with the apex thereof disposed toward the forward end of the aircraft and the base toward the after end of the cage assembly. The cage assembly also includes a plurality of upwardly extending tubular members 50 (FIG. 1) affixed to the underside of the keel 13.

The rear wheels 24 of the landing gear are mounted on axle pins or bolts 25 fitted through bracket blades 26 and 27. The brackets for each wheel are bolted onto opposite sides of the lower end portions of a pair of longitudinally spaced landing gear tubes 30 and 32. These tubes include horizontal midsections, which are parallel and extend slightly beyond the sides of the carriage assembly. From these midsections, the landing gear tubes 30 and 32 include downwardly and inwardly inclined intermediate portions 31 and 33 and vertically disposed, converging outer end portions 35 and 37 to which the wheel mounting brackets are fastened.

Figure 3:
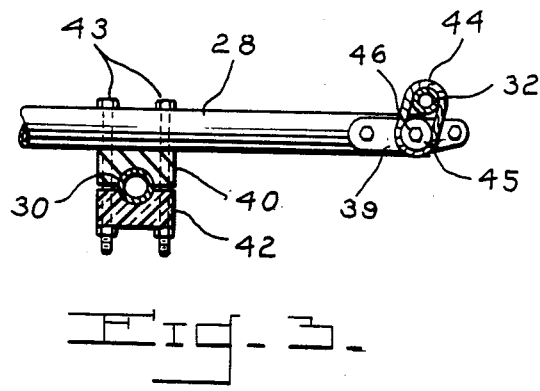
FIG. 3 is a section taken approximately along line 3—3 of FIG. 2.
Figure 4:
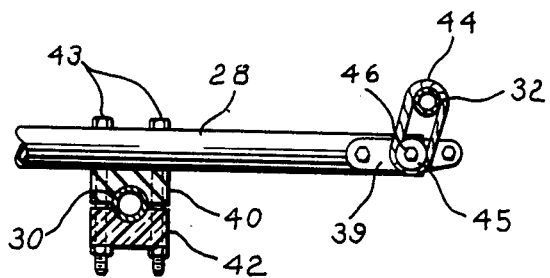
FIG. 4 is a section similar to FIG. 3, but with the parts in different operative positions.

The midsection of tube 30 is disposed on the underside of the carriage side rails 26 and 28, while the midsection of tube 32 is mounted on the upper surface of the side rails, adjacent the after end portions thereof. A pair of brackets 39 are bolted on opposite sides of each of the side rails 26 and 28, and the midsection of rail 32 rests against the upper edges of these brackets. The forward landing gear tube 30 is mounted on the underside of the side rails and is held between a pair of blocks 40 and 42, each having a semicylindrical recess which engages the opposite surfaces of tube 36 (FIG. 3). Suitable fasteners, such as bolts 43, extend vertically through the side rails 26 and 28 and the side edges of the blocks 40 and 42 to hold the blocks together with the tube 30 disposed therebetween. The upper block 40 is preferably of elastomeric material, such as rubber or the like, which will dampen vibrations of the landing gear tube 30 and isolate them from the carriage assembly. The lower block 42 is fabricated from a suitable rigid synthetic plastic, such as nylon or Delrin, which are strong, light weight, corrosion resistant materials and have a relatively low coefficient of friction. With this mounting arrangement, the central portion of the landing gear tube 30 is capable of longitudinal rotation relative to the side rails 26 and 28 of the cage assembly on which it is mounted. The rear landing gear tube 32 is releasably mounted against the upper surface of the side rails by elastic or spring members 44, which as shown herein, may consist of elastic bands or cords, known as bungee cords. These bungee cords are looped over the top of the tube 32 and around the outer end portions of bolts 46, which extend transversely through the tubes 26 and 28. Washers 45, disposed on the ends of the bolts, prevent the bungee cords from slipping off the ends of the bolts. Preferably, each bungee cord is looped a number of times over the tube 32 and around the bolts 46. This landing gear construction is not only simple and easy to assemble, but provides excellent shock absorbing characteristics, which are important in stabilizing the ultralight aircraft when landing. In addition, the landing gear affords a relative degree of comfort to the pilot during both take-off and landing of the aircraft.

On impact with the ground, the upward forces of impact are transmitted to the landing gear tubes 30 and 32 by the wheels 24. Much of this force will cause the midsection of the tube 32 to move upwardly relative to the cage rails 26 and 28, variously stretching the several bungee cord fastening means, depending upon the relative forces of impact on the wheels 24 as they contact the ground. In a level landing, the force of landing will be equally distributed by both wheels 24 with generally equal extension of the bungee cord fasteners. Some of the impact is transmitted by the wheels 24 to forward landing gear tube 30 absorbed by the rubber mounting blocks 40. As the rear landing gear tube 32 is forced upwardly off the side rails 26 and 28 against the tension of the bungee cord loops, a rearward component of force is also applied to the forward landing gear tube 30. This causes the forward tube 30 to rotate through a sufficient angle a (FIG. 2) in its block mounting assembly to accommodate and modulate the movement of the rear landing gear tube. This construction acts to stabilize the action of the bungee cords in response to impact on the wheels 24. As the upward force on the wheels lessens as a result of both the stretching of the bungee cords and the rotation of the forward landing gear tube 30, the energy generated in the bungee cords will strongly urge the rear landing gear tube 32 back toward its rest position on the side rails of the cage assembly. At the same time, the forward tube 30 will be rotated back in a forward direction. In effect, the forward landing gear tube 30 acts in the manner of a stabilizing bar to dampen or modulate against erratic gyrations of the landing gear, which would occur if the shock absorbing system utilized only the spring action of the bungee cords 44.

The shock absorbing landing gear embodying this invention also aids in compensating for those landings in which the plane's wing attitude is tilted to one side or the other. In this type of landing, one or the other of the rear wheels 24 will strike the ground first and with greater force than in a level landing attitude. In this situation, the bungee cords on the lower side of the cage assembly closer to the impacted wheel will be stretched to a greater extent than the cords adjacent the other higher wheel which may remain more or less in its fixed position. This means that only those bungee cords which have been substantially stretched will generate energy to urge the first wheel to return to its normal position. During this time interval, the bungee cords on the higher side of the cage assembly will not have been extended to any substantial extent. Thus, the rear wheel 24 which first strikes the ground will be strongly, but gently urged back to its normal position by bungee cords on that side of the aircraft, while the bungee cords adjacent the other wheel, not having been stretched to any great extent, remain ready to receive the impact of the force caused by the other wheel subsequently striking the ground. In effect, this landing gear construction prevents the plane from bouncing excessively from side to side when in landing with a wing tilted attitude.

From the side rails 26 and 28, the upright tubes 50 of the cage assembly extend from the side rails to the tubular keel 13, to which they are attached by mounting brackets 51. A pair of converging tubular struts 53 also extend from the after end of the cage assembly to the keel tube 13 and are affixed thereto at a point intermediate the wing 10 and tail 14. The keel, which is an aluminum tube, having an outer diameter of about four inches and a wall thickness of about 0.065 of an inch, serves as the backbone or spine of the aircraft. The wing, tail assembly and engine are all supported by this unitary tubular member.

The engine 16 is mounted on a pair of longitudinally extending, laterally spaced, parallel mounting plates 60 and 62 (FIGS. 5 and 6). These plates are attached along the outer side surfaces of the keel tube on rigid blocks 64 of synthetic plastic material, such as Delrin. The inner surfaces of each of these blocks is of concave, cylindrical configuration to abut the outer surface of the keel tube in surface-to-surface engagement, and their outer surfaces are flat and vertically oriented. Disposed within the tube 13 are additional Delrin blocks 66, disposed against the inner surface of the tube 13. The inner surfaces of these blocks are cylindrically convex to abut the inner surface of the keel tube 13. A number of mounting bolts 65 extend through holes in the mounting plates 60 and 62, registered with similar holes in the plastic blocks 64 and 66. The larger dimensions of the mounting plates 60 and 62 are vertically oriented. The plates 60 and 62 may include a number of longitudinally spaced holes (not shown), and the plates may be of tapered width with their largest vertical dimension at the point of greatest stress, which corresponds to the outer end of the keel 13. This construction provides a strong and light weight cantilever mounting arrangement for the engine. Despite the fact that the mounting plates are bolted onto the end of the aluminum tubular keel, the blocks 60 and 64 are in compression and prevent stress damage to the thin wall of the tubular keel 13 by the bolts 65 which support the weight of the engine and its mounting assembly.

The engine 16 is mounted on a base plate 68, which is disposed between the outer end portions of mounting plates 60 and 62. The plate 68 is supported by a pair of angle brackets 69 bolted to the opposed inner surfaces of the mounting plates 60 and 62. The vertical surface of the angle irons 69 are spaced from the plates 60 and 62 by a plurality of shock absorbing, rubber covered fasteners 70 through which bolts 71 extend. The engine, which may be any suitable internal combustion engine, such as a two cylinder, horizontal shaft engine, rated at approximately 30 horsepower is mounted on the upper of the base plate 68. A pulley 73 is fixedly mounted on the engine shaft, and a larger diameter pulley 74 is mounted on the propeller shaft. A flexible drive belt 78, such as a V-belt, is fitted around these two pulleys and causes rotation of the propeller at the proper speed reduction relative to the engine rpm. A bearing 80 for the propeller shaft 76 is affixed by suitable fasteners to the underside of the engine mounting plate 68. With this construction, the engine, propeller and propeller drive shaft are all supported in a cantilever mounting arrangement on the outer end portion of the tubular aluminum keel. The engine mount embodying my invention is of light weight and utilizes a minimum number of components, in addition to those utilized for the aircraft frame itself. Moreover, the mounting is extremely strong, despite being supported by the thin wall aluminum tubular keel 13. Furthermore, engine vibrations are almost completely isolated from the keel 13 and thus, from the aircraft frame itself.

The wing 10 of the ultralight plane is affixed to the upper surface of the keel 13 by any suitable means. A king post 81 comprising a pair of angularly oriented tubular members is affixed to the upper surface of the keel by means of suitable brackets. A plurality of wires 87 extend from the apex of the king post 81 and are affixed at their outer ends at a number of space locations to the frame of the wing. Additional wires 89 extend from the underside of the wing to the cage assembly 20. The wing 10 includes a cloth fabric, tightly stretched over the tubular aluminum frame of the wing. A number of battens (not shown), fitted into pockets provided in the fabric, impart an air foil configuration to the upper surface of the wing.

Figure 8:
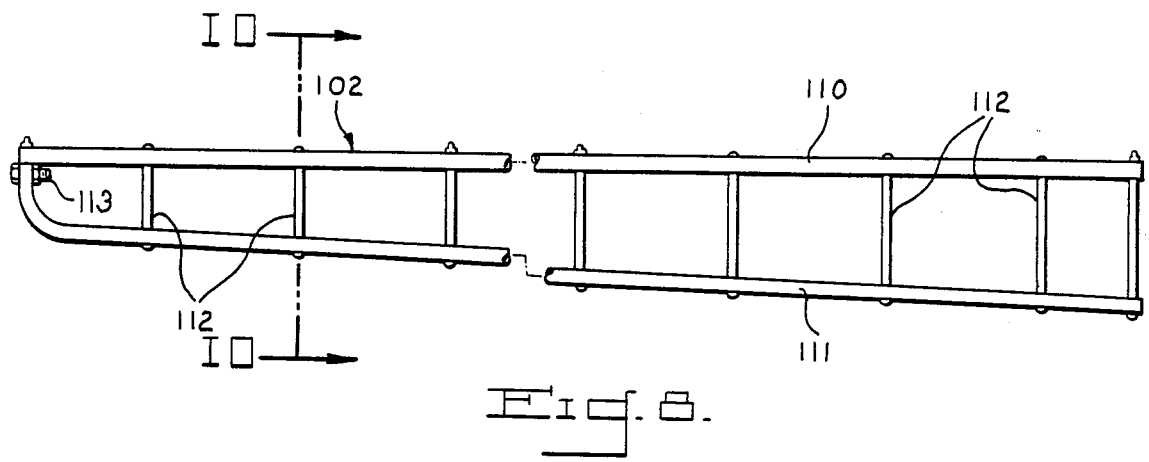
FIG. 8 is a plan view of an aileron frame for the aircraft embodying this invention.
Figure 9:
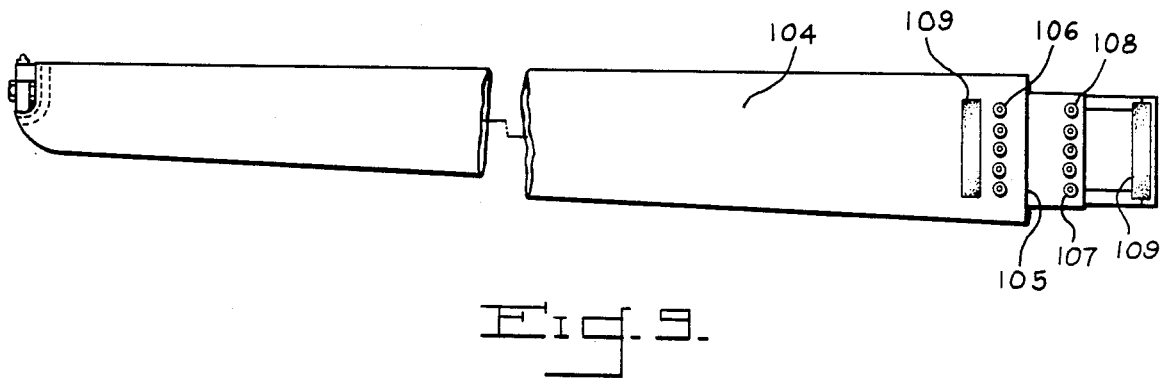
FIG. 9 is a plan view of an aileron fabric sheath used to form the aileron for this aircraft.

Disposed along the trailing edge of each side of the wing is a full-length aileron 100. Each aileron comprises a tubular metal frame 102 (FIG. 8), covered with a tensioned cloth fabric 104 (FIG. 9), preferably of a suitable weight dacron material. The fabric is sewn into the shape of a sleeve or sheath, such as shown at 104 in FIG. 9. The sleeve 104 is tapered in cross sectional size from its larger open end 105 to its inner end. The open end of the sleeve includes a plurality of eyelets or grommeted openings 106. A closure flap 107 extends outwardly of the lower edge of the open end of sleeve 104. The flap 107 includes a number of eyelets 108, which correspond to openings 106, which are adapted to receive a lace or thong used to tightly secure the sleeve over the end of the frame 102. Velcro type fastener strips 109 are affixed adjacent the outer edge flap 107 and on the upper surface of the sleeve 104. The flap 107 is used to cover over the lace type fasteners and insure a smooth overall surface and finished appearance.

Figure 10:
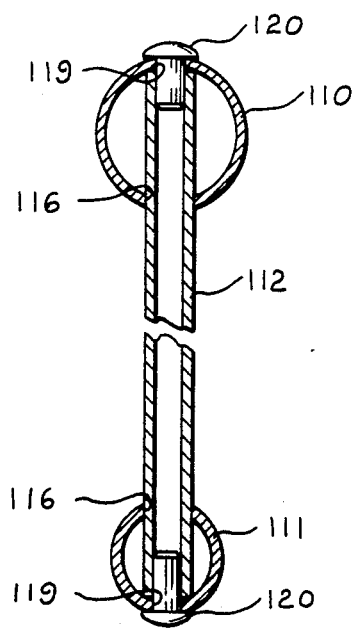
FIG. 10 is a section on an enlarged scale taken along line 10—10 of FIG. 9.

The aileron frame 102 is preferably fabricated of tubular aluminum members comprising a U-shaped outer peripheral frame formed by a leading edge tube 110 and trailing edge tube 111 covered at its outer end and fastened at its outer end to tube 100 as shown at 113. Disposed transversely between the leading and trailing edge tubes are a plurality of tubular cross bars, or struts 112, disposed in spaced parallel relation. The frame 102 is tapered from its inner to its outer end, having generally the same degree of taper as the fabric sleeve. The dimensions and taper of the frame relative to the sleeve is such that it can be easily slipped into the sleeve, with its smaller end fitted into the opening 104 and telescopically slid fully into the sleeve. As the inner end of the frame is thrust all the way into the sleeve and secured therein by lacing together the open end of the sleeve, the fit may be made so snug that the fabric sleeve will be automatically tensioned. As a result, no doping or shrinking of the fabric is required in the assembly procedure of the aileron. The aileron frame 102, while being of a simple and light weight construction, is, nevertheless, characterized by excellent strength and rigidity. The cross bars 112 are also made of aluminum and are of tubular cross section, as best shown in FIG. 10. The outer ends of each of these tubes 112 are fitted into a series of holes 116 drilled in the opposed inner wall portions of the U-shaped peripheral frame members 110 and 111. Opposite each hole 116 in the tubes 110 and 111 is a smaller hole 119 adapted to receive a rivet type fastener 120 (FIG. 10). The peripheral U-shaped frame has sufficient flexibility to enable the cross members of the frame to be readily assembled between the tubes 110 and 111. After the cross tubes 112 are fitted into the opposed inner holes 116, pop rivets 120 are driven through holes 119 and into the outer ends of each tube 112. The outer diameter of the shank portions of the rivets 120 and inner diameter of the tubes 112 are selected to provide a tight fit so as to securely fasten each end of the cross bars in assembled relation within the outer tubular frame to complete the aileron frame. This fastening step may be rapidly and easily accomplished, since no flange or head is needed on the inner end of the rivets. After the frame has been assembled and inserted fully in the tubular sleeve or sheath, the ends of the sheath are tightly closed about the frame by lacing a thong or the like through the eyelets 106 and 108 in the sleeve. The aileron may then be pivotably attached to the trailing edge of each side of the wing of the plane and connected to suitable control wires connected to the control stick 116, located on the right side of the cage assembly 20.

The tail of the ultralight, shown generally at 14 in FIG. 1 is supported on the after end of the keel tube 13 and includes a vertical stabilizer 140 and rudder 142, and horizontal stabilizer 144 and elevator 146. The tail components are constructed of a tubular aluminum frame, and a cloth fabric is tightly stretched over these frames. A curved skid 148 extends from the lower end of the tail 14 to protect the tail against damage from contacting the ground. Rudder and elevators are connected by control wires which run along the underside of the keel tube to the rudder pedals (not shown) and the control stick 115 pivotably mounted in the cage assembly 20.

An important advantage of the aircraft frame embodied in this invention resides in the unitary tubular keel 13, which supports the tail, the wing and the engine mounting of the aircraft, as well as the cage assembly for the pilot. All these components are united by the relatively rigid tubular keel, which provides a simple and clean air frame, which is in sharp contrast with many of the ultralight aircraft heretofore available, which consists of a plurality of tubes and wires to support the tail assembly.

Having thus disclosed this invention, what is claimed is:

1. In an ultralight aircraft of the type having a unitary tubular keel, a wing mounted on the upper surface of said keel with its leading edge adjacent the outer front end of said keel, and an internal combustion engine and a propeller to be driven thereby, an improved cantilever mounting frame for supporting said engine and said propeller on said keel, said mounting frame comprising a pair of laterally spaced plates disposed along opposite exterior side surfaces of the keel and longitudinally extending forwardly of the front end of said keel, first reinforcing block members disposed between said plates and said side surfaces of said keel, said first block members having flat outwardly facing surfaces in mated surface-to-surface engagement with said plates and inwardly-facing concave surfaces in mated surface-to-surface engagement with said exterior side surfaces of said keel, second reinforcing block members disposed inwardly of said keel adjacent said first block members, said second block members having outwardly-facing convex surfaces in mated surface-to-surface engagement with opposite interior side surfaces of said keel, said first and second block members being formed of a relatively rigid, slightly compressible synthetic plastic material, said plates, said first and second block members and said keel having plural registered mounting holes, plural fasteners extending through said mounting holes to secure said plates, said first and second block members, and said keel together with said first and second block members. compressed against said exterior and interior surfaces of said keel to prevent stressing thereof, a bracket on which said engine and propeller are supported, and resilient shock absorbing fasteners affixing said bracket between the forwardly extending ends of said mounting plates for dampening vibration of said engine, whereby said cantilever mounting frame substantially isolates engine vibrations from said keel.

2. The improved cantilever mounting frame in an ultralight aircraft as set forth in claim 1, and characterized further in that the major cross sectional dimensions of said plates are disposed vertically and said bracket is disposed horizontally therebetween, said propeller including a drive shaft and a bearing therefor drivingly coupled to the engine shaft by a speed reduction transmission means, the engine being mounted on the upper surface of said bracket and said bearing for said propeller shaft mounted on the undersurface of said bracket.

3. In an ultralight aircraft of the type having a wing with a leading and trailing edge and an aileron pivotably mounted along the trailing edge on each side of said wing, an improved structure of each said aileron characterized by its ease and quickness of assembly, each said aileron comprising a tubular aluminum frame of tapered configuration from end-to-end, said frame including a leading edge tube and a trailing edge tube, and laterally extending, spaced cross tubes fastened to and extending between the trailing and leading edge tubes of said frame, and a fabric sheath having one open end through which said frame is received telescopically by said sheath, said sheath being tapered and dimensioned relative to said frame to snugly fit in an automatically tensioned manner about said frame with sufficient tautness in said sheath that doping or shrinking thereof is not required, said sheath including a closure flap at one side of said open end and extending longitudinally outwardly of said sheath for reverse folding to the opposite side of said open end to close it about said frame, said closure flap and said opposite side of said open end having cooperating means for affixation thereof to provide a smooth closure of said open end.

4. The improved aileron structure in an ultralight aircraft as set forth in claim 3 and characterized further in that the cross tubes thereof are fitted at each end thereof through holes in opposed inner wall portions of the leading edge tube and the trailing edge tube, each of said cross tubes being affixed therein by fasteners extending through openings in the outer wall portions of said leading and trailing edge tubes registered with said holes, said fasteners extending into the outer ends of each cross tube for fastening the same in assembled relation within the aileron frame.

5. The improved aileron structure in an ultralight aircraft as set forth in claim 4 and characterized further in that each of said fasteners is a rivet having a head on its outer end only.

6. In an ultralight aircraft of the type having a tubular keel and a cage assembly depending from the underside of said keel, an improved shock-absorbing landing gear assembly for said cage assembly, said landing gear assembly comprising side rails affixed to said cage assembly to extend longitudinally of said keel, a pair of landing gear tubes laterally extending and longitudinally spaced relative to said side rails, the forward one of said landing gear tubes being disposed on the underside of said side rails and the rearward one of said landing gear tubes being disposed above said side rails, a pair of landing wheels rotatably mounted on the laterally outward ends of said landing gear tubes for ground engagement and rotation about a lateral axis of the aircraft, journal means affixed to the underside of said side rails and rotatably clamping said forward landing gear tube, and spring means extending between said side rails and said rearward landing gear tube for urging it into a normal position resting in juxtaposition on the upper surfaces of said side rails and for permitting yielding displacement of said rearward landing gear tube upwardly upon ground impact of said wheels during landing of the aircraft for absorbing the shock of such impact, said forward landing gear tube being operative to rotate in said journal means upon such impact to constrain said rearward landing gear tube to move yieldably in a generally arcuate path for stabilizing and modulating the yielding displacement of said rearward landing gear tube.

7. The improved landing gear assembly in an ultralight aircraft as set forth in claim 6 and characterized further in that said journals are mounting blocks for the forward landing gear tube and include a vibration dampening material, and in which said spring means comprises elastic cords disposed about the rear landing gear tube at the locations where it traverses said side rails to urge said tube toward said juxtaposition with the side rails, said landing gear tubes and rear wheels carried thereby being pivotable together about said lateral axis for absorbing ground shock.

8. The improved landing gear assembly in an ultralight aircraft as set forth in claim 6 and characterized further in that said elastic cords comprise bungee cords, each being looped over the rear landing gear tube a number of times and in which said mounting blocks on the forward landing gear tube include an upper block of rubber having a semi-cylindrical recess and a lower block of rigid synthetic plastic material also having a semi-cylindrical recess therein, said rubber and plastic blocks serving as dampening cylindrical journals for the forward landing gear tube, whereby ground impact upon the rear wheels of said landing gear causes angular movement of both the forward and rear landing gear tubes, said movement being releasably restrained by both the cylindrical journals and by said bungee cords.

* * * * *